United States Patent
Kondo et al.

(10) Patent No.: US 9,664,162 B2
(45) Date of Patent: May 30, 2017

(54) SEALING STRUCTURE

(71) Applicant: NOK CORPORATION, Tokyo (JP)

(72) Inventors: Yosuke Kondo, Kitaibaraki (JP); Hikaru Tadano, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 14/766,354

(22) PCT Filed: Feb. 17, 2014

(86) PCT No.: PCT/JP2014/053658
§ 371 (c)(1),
(2) Date: Aug. 6, 2015

(87) PCT Pub. No.: WO2014/126243
PCT Pub. Date: Aug. 21, 2014

(65) Prior Publication Data
US 2015/0369188 A1    Dec. 24, 2015

(30) Foreign Application Priority Data
Feb. 18, 2013  (JP) .................... 2013-028949

(51) Int. Cl.
F02M 61/16      (2006.01)
F02M 55/00      (2006.01)
F16J 15/10      (2006.01)
F02M 61/14      (2006.01)

(52) U.S. Cl.
CPC .......... *F02M 55/005* (2013.01); *F02M 61/14* (2013.01); *F16J 15/10* (2013.01); *F02M 2200/858* (2013.01)

(58) Field of Classification Search
CPC .. F16J 15/02; F16J 15/021; F16J 15/10; F16J 15/102; F02M 2200/858
See application file for complete search history.

(56) References Cited

U.S. PATENT DOCUMENTS 3,747,960 A * 7/1973 Bawa ............... H02G 3/06
                                                   285/332.2
3,990,730 A * 11/1976 Ekman ............. F16L 17/035
                                                   285/110
(Continued)

FOREIGN PATENT DOCUMENTS

CN       2727423 Y      9/2005
EP      1 357 284 A1   10/2003
(Continued)

OTHER PUBLICATIONS

Chinese Office Action dated Apr. 5, 2016 with English translation.
(Continued)

Primary Examiner — Gilbert Lee
(74) Attorney, Agent, or Firm — Harness, Dickey & Pierce, P.L.C.

(57) ABSTRACT

A sealing device exhibits a sealing function even when it is in a state in which squeeze of a seal ring is reduced and in a low-temperature condition. A sealing structure is provided with a cylinder head (300) for an engine which has an injector mounting hole (310) and is exposed to high pressure gas; an injector which is mounted in the injector mounting hole (310); and a seal ring (100) made of resin which seals an annular gap between the injector mounting hole (310) and the injector (200), wherein a step having a larger diameter on a combustion chamber side (E) where the high pressure gas is present is formed on an inner peripheral surface of the injector mounting hole (310), and the seal ring (100) is attached to a position where the seal ring is in close contact with a step surface (310c) of the step.

2 Claims, 3 Drawing Sheets

(56) References Cited

U.S. PATENT DOCUMENTS

| | | | |
|---|---|---|---|
| 6,811,102 B2 * | 11/2004 | Krause | F02M 61/14 239/533.2 |
| 6,938,901 B2 | 9/2005 | Tsuchiya et al. | |
| 7,918,209 B2 * | 4/2011 | Fischetti | F02M 61/14 123/470 |
| 2002/0179057 A1 * | 12/2002 | Reiter | F02M 51/0671 123/472 |
| 2003/0090069 A1 | 5/2003 | Keck | |
| 2004/0080115 A1 * | 4/2004 | Tsuchiya | F02M 61/14 277/458 |
| 2005/0066942 A1 | 3/2005 | Ohkubo et al. | |
| 2005/0109325 A1 | 5/2005 | Tomita | |
| 2006/0232066 A1 * | 10/2006 | Kanagae | F16L 21/035 285/348 |
| 2008/0245340 A1 | 10/2008 | Beardmore | |

FOREIGN PATENT DOCUMENTS

| | | |
|---|---|---|
| JP | 2002-081548 A | 3/2002 |
| JP | 2005-098238 A | 4/2005 |
| JP | 2006-250360 A | 9/2006 |
| WO | 2010-082628 A1 | 7/2010 |

OTHER PUBLICATIONS

Japanese Office Action dated May 31, 2016 with English translation.
Korean Office Action dated Sep. 8, 2016.
Extended European search report dated Jan. 4, 2017.

* cited by examiner

SEALING STRUCTURE

CROSS-REFERENCE TO RELATED APPLICATIONS

This application is a National Stage of International Application No. PCT/JP2014/053658, filed Feb. 17, 2014, which claims priority to Japanese Application No. 2013-028949, filed Feb. 18, 2013. The entire disclosures of each of the above applications are incorporated herein by reference.

FIELD

The present disclosure relates to a sealing structure which prevents leakage of high pressure gas.

BACKGROUND

On a portion where an injector is mounted to a cylinder head for an engine, a sealing device is provided in order to prevent leakage of high-pressure combustion gas from an annular gap between a mounting hole formed in the cylinder head and the injector. In addition, on a portion where mounted components such as various sensors are mounted to the cylinder head, the sealing device is provided similarly, as well. In such a sealing device, there is known a technique which employs a seal ring made of resin which has a small number of components and is capable of suppressing noises caused by vibrations as compared with the case where a metal washer-like seal is used (see Patent Literature 1).

However, the seal ring made of resin has a problem that a squeeze on an outer peripheral surface side is reduced over time due to creep deformation, thereby deteriorating its sealing function.

CITATION LIST

Patent Literature

Patent Literature 1: Japanese Patent Application Laid-open No. 2002-81548

SUMMARY

Technical Problem

An object of the present disclosure is to provide a sealing structure that is capable of exhibiting a sealing function even when it is in a state in which a squeeze of the seal ring is reduced and is in a low-temperature condition.

Solution to Problem

In order to solve the above problem, the present disclosure has adopted the following means.

That is, the sealing structure of the present disclosure is a sealing structure comprising: a member which has a mounting hole and is exposed to high pressure gas; a mounted component which is mounted in the mounting hole; and a seal ring made of resin which seals an annular gap between the mounting hole and the mounted component, wherein a step having a larger diameter on a side where the high pressure gas is present is formed on an inner peripheral surface of the mounting hole, and the seal ring is attached to a position where the seal ring is in close contact with a step surface of the step.

According to the present disclosure, even in a case where a gap is formed between an outer peripheral surface of the seal ring and the inner peripheral surface of the mounting hole, the state in which the seal ring is in close contact with the step surface of the step formed on the inner peripheral surface of the mounting hole is maintained, thereby making it possible to prevent leakage of the high pressure gas. Consequently, even if a gap is formed between the outer peripheral surface of the seal ring and the inner peripheral surface of the mounting hole due to a reduction of the squeeze of the seal ring over time and shrinking of the diameter of the seal ring in a low-temperature condition, the sealing function can be exhibited.

Advantageous Effects of the Disclosure

As described thus far, according to the present disclosure, the sealing function can be exhibited even when the sealing structure is in the state in which the squeeze of the seal ring is reduced and is in the low-temperature condition.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

A sealing structure according to the present disclosure is a structure for preventing leakage of high pressure gas such as combustion gas or the like. More specifically, the sealing structure according to the present disclosure is a structure which seals an annular gap between a mounting hole which is formed in a member exposed to the high pressure gas and a mounted component mounted in the mounting hole. In the following description, the description will be given by using, as an example, the case of a sealing structure which seals an annular gap between a mounting hole formed in a cylinder head as a member exposed to high pressure gas and an injector as a mounted component mounted in the mounting hole. Note that the present disclosure can also be applied to a sealing structure which seals an annular gap between a mounting hole formed in a cylinder head and various sensors (e.g., combustion pressure sensors) mounted in the mounting hole. In addition, the present disclosure is not limited to a cylinder head, as the present disclosure can also be applied to a sealing structure which seals an annular gap between a mounting hole formed in a member exposed to high pressure gas and various mounted components mounted in the mounting hole.

EXAMPLE

Mounting Structure of Injector

Figure 1:
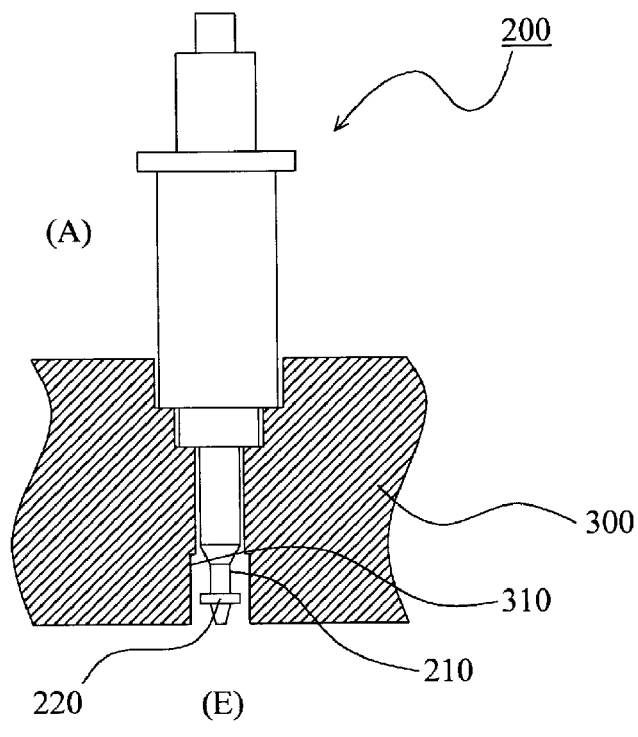
FIG. 1 is a schematic cross-sectional view showing a mounting structure of an injector according to an example of the present disclosure.

A mounting structure of the injector to which the sealing structure according to the present example is applied will be described with reference to FIG. 1. Note that, in FIG. 1, the depiction of a seal ring is omitted for the convenience of the description.

An injector mounting hole 310 is formed in a cylinder head 300 for an engine. An injector 200 is mounted to the injector mounting hole 310 such that its tip portion is inserted into the injector mounting hole 310. In the drawing, a side below the cylinder head 300 is a combustion chamber side (E), and a side above the cylinder head 300 is an air side (A). As high-pressure combustion gas is generated in the combustion chamber side (E), it is necessary to prevent the combustion gas from leaking to the air side (A) through an annular gap between the injector mounting hole 310 and the injector 200. For this reason, by providing an annular groove 210 on the tip portion of the injector 200 and attaching a seal ring (tip seal) into the annular groove 210, the combustion gas is prevented from leaking through the annular gap to the air side (A). Note that a flange 220 is provided in the vicinity of the tip of the injector 200. Accordingly, when the injector 200 is pulled out from the cylinder head 300, the seal ring can also be pulled out at the same time.

<Sealing Structure>

Figure 2:
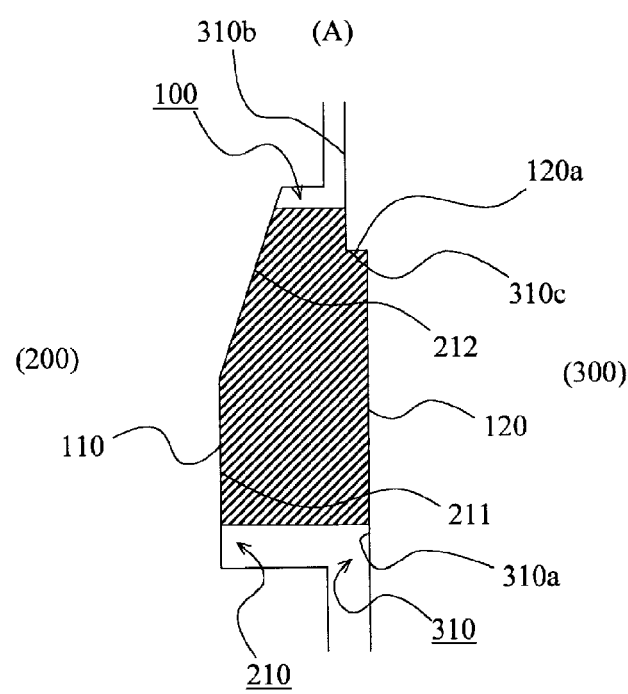
FIG. 2 is a schematic cross-sectional view showing an attachment state of a seal ring according to the example of the present disclosure, the seal ring being in its initial state.

With reference to FIG. 2, the sealing structure according to the example of the present disclosure will be described. FIG. 2 is a schematic cross-sectional view showing an attachment state of a seal ring 100 in its initial state according to the example of the present disclosure. Note that the cross-sectional view in FIG. 2 shows a part of a cross section obtained by cutting the seal ring 100 with a plane including its central axis. Note that the sealing structure according to the present example has a rotationally symmetric shape, and hence it has the same cross-sectional shape on any plane including the central axis of the seal ring 100.

The seal ring 100 is a cylindrically-shaped member formed of a resin material having a heat resistance of at least 200 degrees Celsius (e.g. a resin composite made of PTFE or PTFE and a filler). Thus, the cross-sectional shape obtained by cutting the seal ring 100 with the plane including its central axis is rectangular. That is, an inner peripheral surface side of the seal ring 100 is constituted of a columnar surface 110 which is in close contact with a groove bottom surface of the annular groove 210, and an outer peripheral surface side thereof is constituted of a columnar surface 120 which is in close contact with an inner peripheral surface of the injector mounting hole 310. Note that the seal ring 100 deforms so as to follow the shape of the groove bottom surface of the annular groove 210 and the shape of the inner peripheral surface of the injector mounting hole 310, and hence, as shown in FIG. 2, the cross-sectional shape is not rectangular when being in an attachment state.

The seal ring 100 has a squeeze at least in its initial state. Accordingly, the columnar surface 110 on the inner peripheral surface side and the columnar surface 120 on the outer peripheral surface side are in close contact with the groove bottom surface of the annular groove 210 and the inner peripheral surface of the injector mounting hole 310, respectively, in a state of having a sufficient surface pressure.

With respect to the groove bottom surface of the annular groove 210 of the injector 200, the combustion chamber side (E) thereof is constituted of a columnar surface 211, whereas the air side (A) thereof is constituted of a tapered surface 212 which increases in diameter towards the air side (A). Accordingly, the sealing ring 100 is pressed towards the air side (A) by the pressure of the combustion gas and is compressed against the tapered surface 212, and hence a self-sealing function is exhibited. With respect to the inner peripheral surface of the injector mounting hole 310, the combustion chamber side (E) thereof is a large diameter portion 310a, whereas the air side (A) thereof is a small diameter portion 310b, and a step having a larger diameter on the combustion chamber side (E) where the high pressure gas is present is formed. Here, a step surface 310c between the large diameter portion 310a and the small diameter portion 310b are designed to be perpendicular to the central axes of the seal ring 100 and the injector mounting hole 310.

In the present example, the seal ring 100 is attached so as to be inserted into the side of the small diameter portion 310b of the injector mounting hole 310. Accordingly, the outer peripheral surface side of the seal ring 100 deforms so as to follow the inner peripheral surface of the injector mounting hole 310, and hence the outer peripheral surface of the seal ring 100 also deforms so as to form a step. A step surface 120a formed by such deformation comes into close contact with the step surface 310c between the large diameter portion 310a and the small diameter portion 310b on the inner peripheral surface of the injector mounting hole 310.

(Advantages of Sealing Structure according to Present Example)

According to the sealing structure of the present example, even in a case where a gap is formed between the outer peripheral surface of the seal ring 100 and the inner peripheral surface of the injector mounting hole 310, the state in which the seal ring 100 is in close contact with the step surface 310c of the step formed on the inner peripheral surface of the injector mounting hole 310 is maintained, thereby making it possible to prevent the leakage of the high pressure gas. This point will be described in greater detail with reference to FIG. 3.

Figure 3:
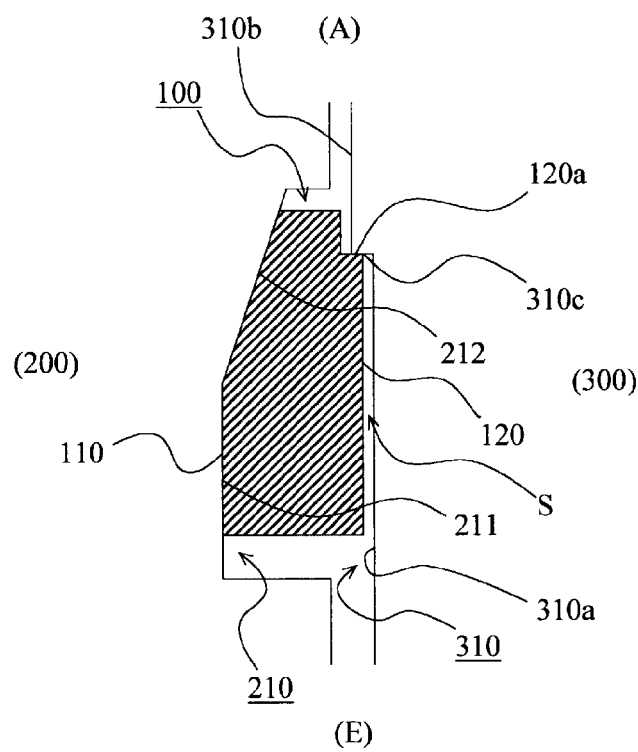
FIG. 3 is a schematic cross-sectional view showing the attachment state of the seal ring according to the example of the present disclosure, the seal ring being in a state in which a squeeze of the seal ring is reduced and in a low-temperature condition.

FIG. 3 is a schematic cross-sectional view showing the attachment state of the seal ring 100 according to the example of the present disclosure, the seal ring 100 being in a state in which its squeeze is reduced and in a low-temperature condition. As described above, in the initial state, the seal ring 100 is provided with the squeeze on each of the inner peripheral surface side and the outer peripheral surface side. However, the squeeze may be reduced over time. When it is in such a state in which the squeeze is reduced, the diameter of the seal ring 100 may be reduced as an environmental temperature becomes low, and then, as shown in FIG. 3, a gap S may be formed between the outer peripheral surface of the seal ring 100 and the inner peripheral surface of the injector mounting hole 310.

However, in the case of the sealing structure according to the present example, the state in which the step surface 120a on the outer peripheral surface of the seal ring 100 is in close contact with the step surface 310c between the large diameter portion 310a and the small diameter portion 310b on the inner peripheral surface of the injector mounting hole 310 can be maintained. Consequently, even in the case where the above gap S is formed, a sealing function can be exhibited.

First Modification

Figure 4:
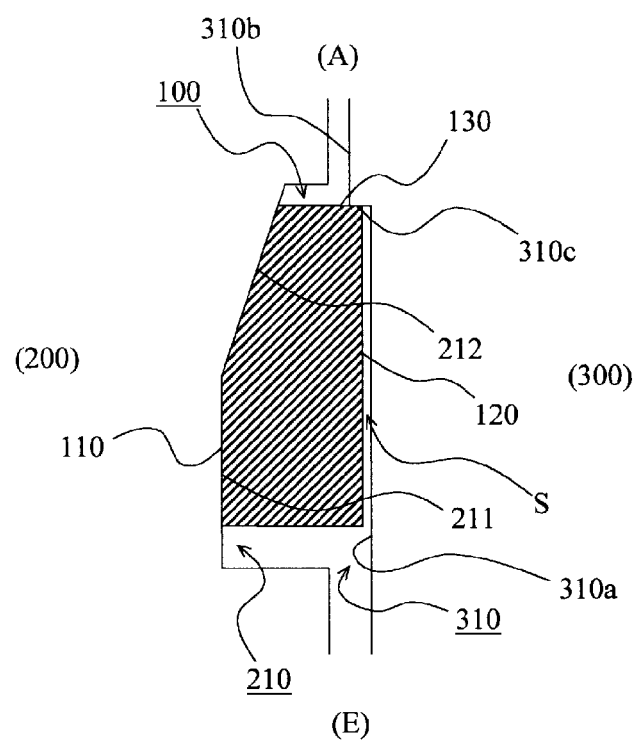
FIG. 4 is a schematic cross-sectional view showing an attachment state of a seal ring according to a first modification of the present disclosure, the seal ring being in a state in which a squeeze of the seal ring is reduced and in a low-temperature condition.

In the above example, the case has been described where, by attaching the seal ring 100 so as to be inserted into the side of the small diameter portion 310b of the injector mounting hole 310, the step surface 120a formed on the seal ring 100 comes into close contact with the step surface 310c on the inner peripheral surface of the injector mounting hole 310. However, as shown in FIG. 4, a tip surface 130 of the seal ring 100 may also be configured so as to come into close contact with the step surface 310c on the inner peripheral surface of the injector mounting hole 310. Also in this case, as shown in FIG. 4, even when the gap S is formed between the outer peripheral surface of the seal ring 100 and the inner peripheral surface of the injector mounting hole 310, the state in which the tip surface 130 of the seal ring 100 is in close contact with the step surface 310c of the injector mounting hole 310 can be maintained. Consequently, even in the case where the above gap S is formed, the sealing function can be exhibited. Note that, in FIG. 4, the same constituent parts as those described in the above example are designated by the same reference numerals.

Second Modification

Figure 5:
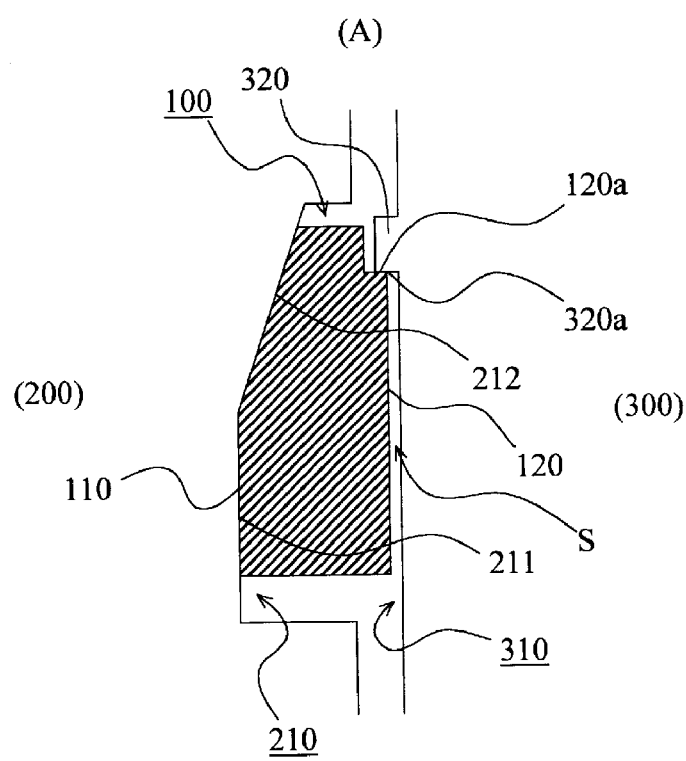
FIG. 5 is a schematic cross-sectional view showing an attachment state of a seal ring according to a second modification of the present disclosure, the seal ring being in a state in which a squeeze of the seal ring is reduced and in a low-temperature condition.

In the above example, the case has been described where, by constituting the inner peripheral surface of the injector mounting hole 310 such that the combustion chamber side (E) thereof becomes the large diameter portion 310a and the air side (A) thereof becomes the small diameter portion 310b, the step having the larger diameter on the combustion chamber side (E) where the high pressure gas is present is formed. However, as shown in FIG. 5, it is also possible to form a step having a larger diameter on the combustion chamber side (E) where the high pressure gas is present by providing an annular protruding portion 320 on the inner peripheral surface of the injector mounting hole 310. Also in this case, a surface of the protruding portion 320 on the combustion chamber side (E) serves as a step surface 320a. The step surface 320a may also be designed to be perpendicular to the central axes of the seal ring 100 and the injector mounting hole 310. Note that, similar to the case of the above example, FIG. 5 shows the case where, by attaching the seal ring 100 so as to be inserted into the side of the protruding portion 320 of the injector mounting hole 310, the step surface 120a formed on the seal ring 100 comes into close contact with the step surface 320a on the protruding portion 320. However, similar to the case of the first modification described above, the tip surface 130 of the seal ring 100 may be configured to come into close contact with the step surface 320a. Note that, in FIG. 5, the same constituent parts as those described in the above example are designated by the same reference numerals.

REFERENCE SIGNS LIST

100: seal ring
110: columnar surface
120: columnar surface
120a: step surface
130: tip surface
200: injector
210: annular groove
211: columnar surface
212: tapered surface
220: flange
300: cylinder head
310: injector mounting hole
310a: large diameter portion
310b: small diameter portion
310c: step surface
320: protruding portion
320a: step surface

The invention claimed is:
1. A sealing structure comprising:
a member which has a mounting hole and is exposed to high pressure gas;
a mounted component which is mounted in the mounting hole;
a seal ring which is formed of a single member made of resin and seals an annular gap between the mounting hole and the mounted component, wherein
a step having a larger diameter on a side where the high pressure gas is present is formed on an inner peripheral surface of the mounting hole, and
the seal ring is attached to a position where the seal ring is in direct contact with a step surface of the step; and
wherein the mounted component is provided with a tapered surface which increases in diameter from the side where the high pressure gas is present to an opposite side thereto, and the seal ring is compressed against the tapered surface by a pressure of the high pressure gas.
2. The sealing structure according to claim 1, wherein a step surface formed by deformation of an outer peripheral surface of the seal ring is in close contact with the step surface of the step formed on the inner peripheral surface of the mounting hole.

* * * * *